UNITED STATES PATENT OFFICE.

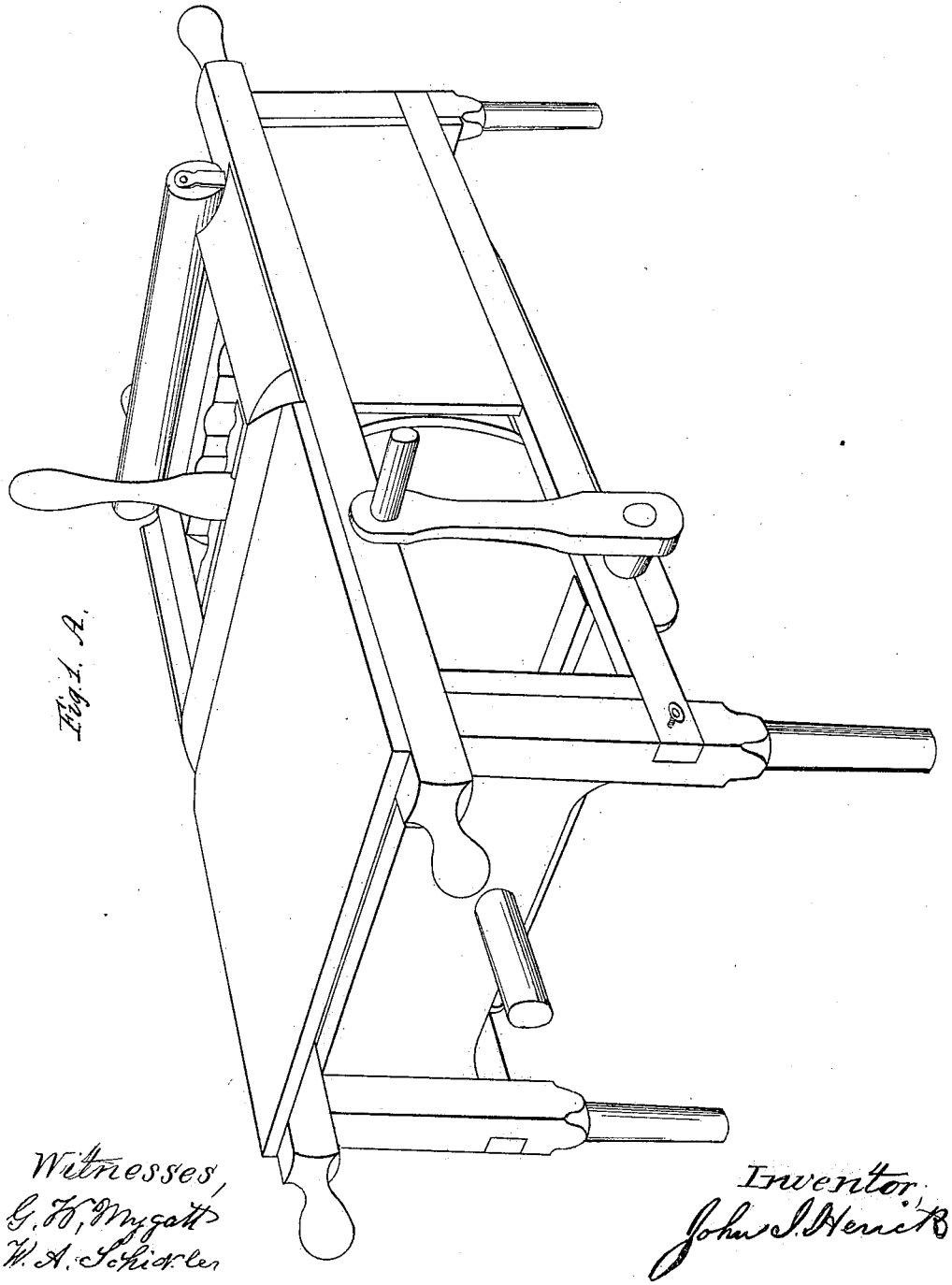

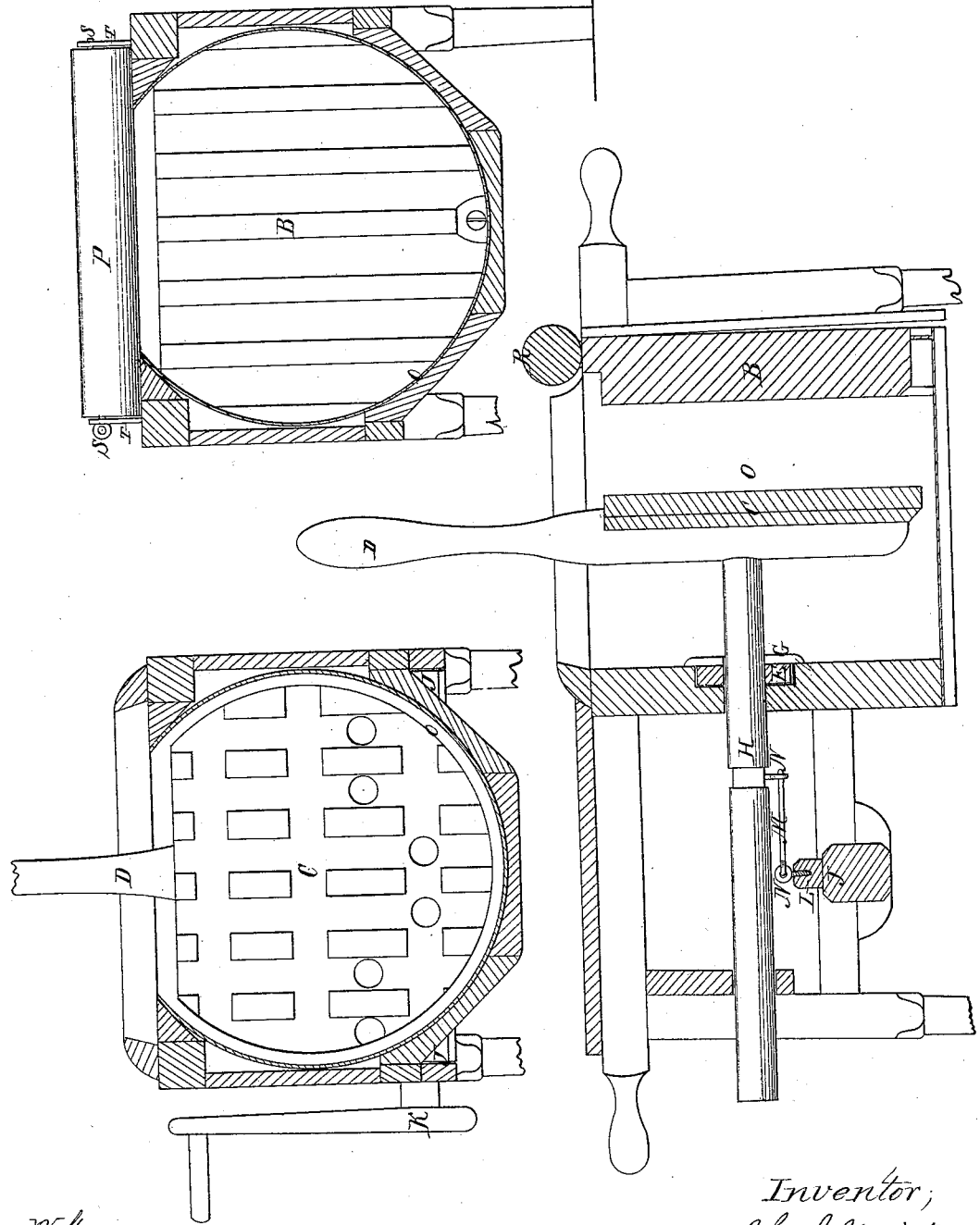

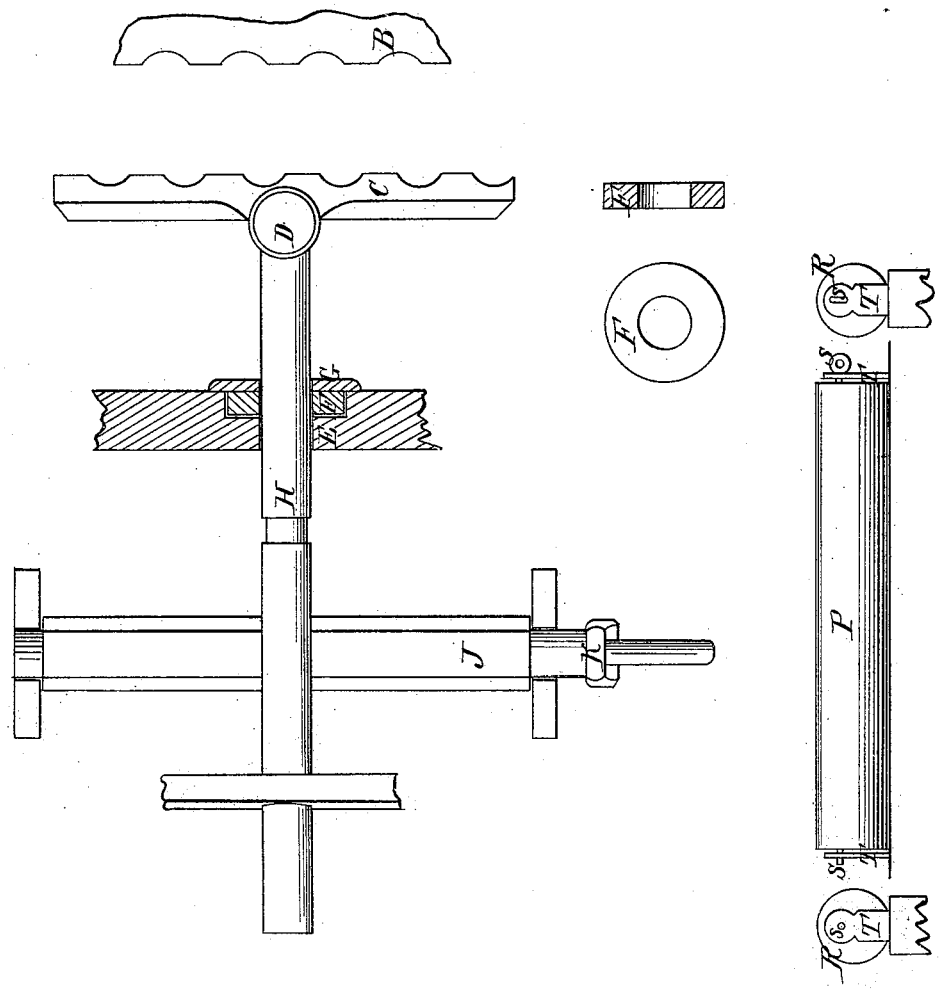

JOHN I. HERRICK, OF HORICON, WISCONSIN.

WASHING-MACHINE.

Specification forming part of Letters Patent No. 52,166, dated January 23, 1866.

*To all whom it may concern:*

Be it known that I, JOHN I. HERRICK, of Horicon, in the county of Dodge and State of Wisconsin, have invented a new and useful Improvement on a Washing-Machine; and I do hereby declare that the following is a full, clear, and exact description of the construction and operation of the same, reference being had to the annexed drawing, making a part of this specification, in which—

Figure 1, Letter A, is a perspective view of the machine; Letter B, stationary wash-board with plain or convex and concave surface; C, movable wash-board with plain or convex and concave surface at angles; D, handle of movable wash-board; E, chamber for packing in end of wash tray or collar; F, packing in chamber, allowing motion of shaft; G, collar securing packing in place; H, shaft controlling movable wash-board; J, windlass giving motion to lever or standard; K, crank and handle; L, lever or standard attached to windlass controlling motion of shaft; M, link connecting windlass lever or standard and shaft; N N, eyebolts in shaft and standard holding in position the link M; O, wash-tray; P, eccentric clamp securing articles in place for washing; R R, ends of clamp; S S, pivots revolving with the clamp; T T, standards supporting clamp.

What I claim as my improvement, and desire to secure by Letters Patent, is as follows:

The combination of the shaft, link, and staples and the standard to the crank-shaft or windlass, whereby the shaft and movable wash-board is moved forward and backward, as specified.

JOHN I. HERRICK.

Witnesses:
G. W. MYGATT,
CHAS. C. RATTINGER,
K. A. SCHICKLER.